April 3, 1951     W. J. LUCKOCK     2,547,030
VIEW FINDER FOR TELEVISION CAMERAS
Filed Dec. 1, 1945
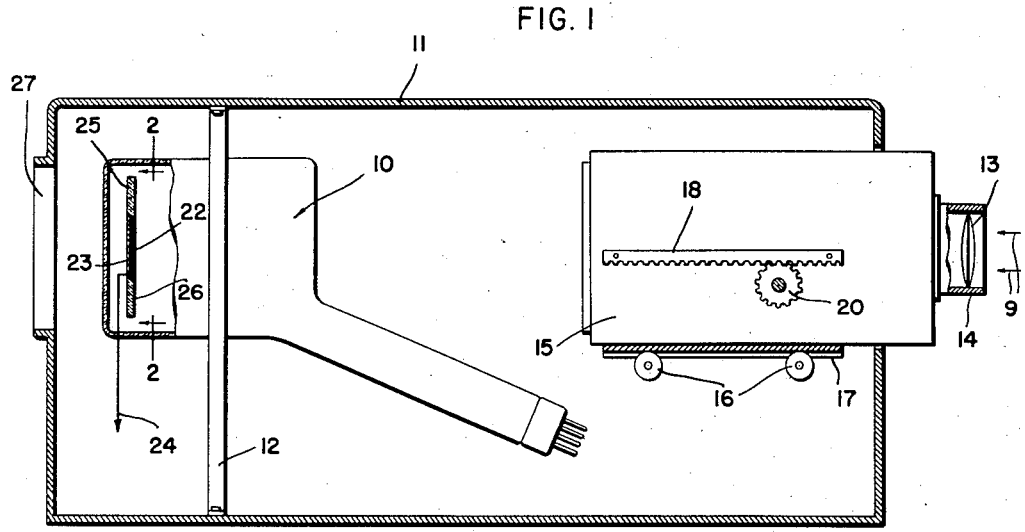
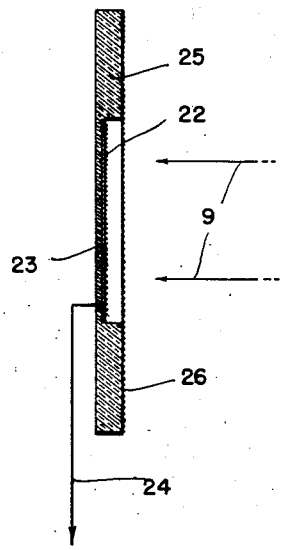
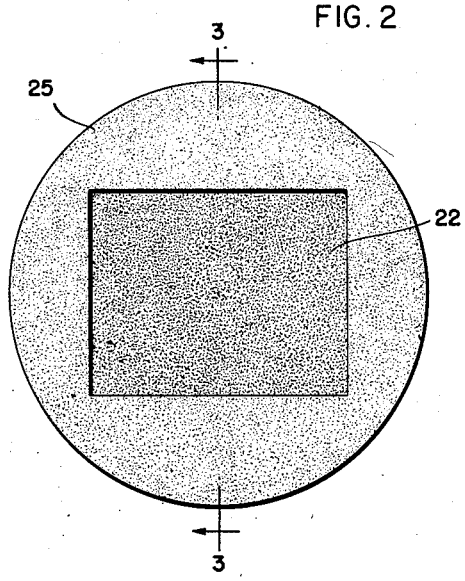
INVENTOR
W. J. LUCKOCK
ATTORNEY Patented Apr. 3, 1951

2,547,030

UNITED STATES PATENT OFFICE

2,547,030

VIEW FINDER FOR TELEVISION CAMERAS

Wayne Joseph Luckock, Fort Wayne, Ind., assignor, by mesne assignments, to Farnsworth Research Corporation, a corporation of Indiana Application December 1, 1945, Serial No. 632,229

5 Claims. (Cl. 178—7.2)

This invention relates generally to camera apparatus, and more particularly relates to a view finder for television cameras.

In the television art, as in the motion picture art, it has been found that it is necessary to focus a generally changing field of view upon the light responsive surface of a camera. To this end it has been proposed to provide a television camera with two identical optical systems, one of which focuses an image of the object upon the light responsive surface of the camera, while the other lens system focuses an image upon a viewing screen. A television camera of this type requires two optical systems which appreciably increases the cost thereof. In order to overcome the parallax effect inherent with a camera having two parallel optical systems it has further been proposed to guide the two lens systems mechanically in a manner to change the angle which the lens systems form with the object in dependence upon the distance of the object.

Another television camera has been suggested comprising a single lens system and a semitransparent mirror which reflects a portion of the incident light upon a viewing screen, while the remainder of the light is transmitted through the mirror and focused on the light responsive screen of the camera. The drawback of this arrangement is that the intensity of the light focused on the light responsive screen is considerably reduced in view of the fact that a portion of the incident light is diverted to the viewing screen.

It is well known in the art that most light responsive screens such as used in television cameras are preponderantly responsive to infrared light. Unless a lens system is utilized which corrects for the chromatic aberration, a light image which is focused by means of visible light will not be correctly focused on the light responsive screen of the camera. This is due to the fact that the visible light is focused by an uncorrected lens system in a plane which is different from the focal plane of the infra-red light. Although a conventional achromatic lens system is designed to provide a common focal plane for the visible light, invisible light will generally not be focused in the same plane. It is, therefore, desirable to provide a view finder which will correct for this effect so that an image of the object is accurately focused in infra-red light on the light responsive screen of the camera when a visible image is focused on the viewing screen.

It is an object of the present invention, therefore, to provide a view finder for cameras including television cameras which will overcome the above mentioned disadvantages of arrangements of the prior art.

Another object of the invention is to provide a method of focusing a field of view on the light responsive screen of a camera.

A further object of the invention is to provide a viewing screen for television cameras which will permit to focus accurately an infra-red image of the object to be transmitted upon the surface of a light responsive screen.

In accordance with the present invention, there is provided, in a camera, an optical system, a light responsive screen and a viewing screen extending beyond the light responsive screen. The light responsive screen and the viewing screen are positioned to receive light from the optical system.

For a better understanding of the invention, together with other and further objects thereof, reference is made to the following description, taken in connection with the accompanying drawing, and its scope will be pointed out in the appended claims.

In the accompanying drawing:

Fig. 1 illustrates schematically a television camera provided with a view finder in accordance with the invention;

Fig. 2 is an elevational view on enlarged scale taken on line 2—2 of Fig. 1 and illustrating the light responsive screen and the viewing screen of the camera; and Fig. 3 is a cross-sectional view taken on line 3—3 of Fig. 2.

Referring particularly to Fig. 1 of the drawing, there is illustrated schematically television camera 10 provided with a view finder in accordance with the invention. Television camera 10 may be an image dissector tube or a picture pickup tube of the charge storage type as illustrated. Camera 10 is mounted in light tight casing 11 by supporting ring 12. Optical lens system 13 is supported in lens holder 14 forming part of movable housing 15. The light from the object or field of view impinges on lens system 13 in a direction indicated by arrows 9. Housing 15 is movably supported by guide rollers 16 cooperating with rails 17 on housing 15. For the purpose of varying the distance between optical system 13 and camera 10, there is provided pinion gear 20 meshing with rack 18 fixed to housing 15. By rotating pinion gear 20 in any suitable manner, not shown, housing 15 may be reciprocated thus positioning lens system 13 with respect to camera 10.

As illustrated particularly in Figs. 2 and 3, television camera 10 is provided with light responsive screen 22 which may consist of a photosensitive cathode or of a mosaic electrode as shown. As is well known in the art, a mosaic electrode consists of a multitude of discreet photosensitive islands supported by an insulating material such as mica and cooperating with a metallic signal plate 23 arranged for developing picture signals. Light responsive screen 22 is preponderantly responsive to infra-red light. The picture signals may be obtained from output lead 24.

In accordance with the present invention, light responsive screen 22 is rigidly supported by transparent member 25 extending laterally beyond light responsive screen 22. Member 22 may consist, for example, of transparent mica or glass. Transparent member 25 further serves as a viewing screen and is provided with viewing surface 26 which may be of frosted or ground glass.

As pointed out hereinabove, lens system 13 will normally not be corrected for chromatic aberration in the infra-red spectral range. Accordingly, the visible light is focused by lens system 13 in a plane which is nearer lens system 13 than the plane in which the infra-red light is focused. Therefore, it is preferred to arrange viewing surface 26 in such a manner that it is spaced a predetermined distance from the effective surface of light responsive screen 22. As illustrated in the drawing, viewing surface 26 should be spaced a smaller distance from lens system 13 than light responsive screen 22. The distance between the effective surfaces of viewing screen 25 and light responsive screen 22, which has been shown exaggerated in the drawing, will generally be very small and depends upon the optical properties of lens system 13. With the relative distances between lens system 13 and the effective surfaces of light responsive screen 22 and viewing screen 25 as shown in the drawing, an infra-red image of the object will be focused on light responsive screen 22 when a visible image is focused on viewing surface 26.

The view finder of the invention may also be used with light responsive screens which have their maximum light sensitivity in the ultra-violet spectral region. In that case viewing surface 26 should have a larger spacing from lens system 13 than light responsive screen 22.

Viewing opening 27 is provided in casing 11 so that viewing screen 25 may be observed from the rear of camera 10. Light responsive screen 22 will normally be opaque so that the image of the object can not be seen on screen 22 from opening 27. However, the outer portion of the field of view of the image focused by lens system 13 on screens 22 and 25 will be visible through viewing opening 27 on viewing surface 26 which extends beyond light responsive screen 22. The optical image may now be focused visually on viewing surface 26 by rotating pinion gear 20 to adjust the relative distance between viewing surface 26 and lens system 13. When the visible image of the object to be transmitted is in focus on viewing surface 26, the infra-red image of the object will be automatically in focus on light responsive screen 22 in view of the predetermined distance between the effective surface of light responsive screen 22 and viewing surface 26.

It is to be understood that when an achromatic lens system 13 is used which is corrected for the chromatic aberration in the infra-red spectral region, that is, for that region where light responsive screen 25 has its maximum light sensitivity, the surfaces of viewing screen 25 and light responsive screen 22 should be co-planar.

As illustrated particularly in Figs. 2 and 3, light responsive screen 22 is mechanically supported by viewing screen 25 so that no further means are required for holding light responsive screen 22. Output lead 24 may extend through viewing screen 25 as illustrated schematically in Fig. 3.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a camera, an optical system, a photosensitive, electron emissive screen having its maximum light sensitivity at a predetermined wavelength outside the visible spectral region, a viewing screen extending on each side of said photosensitive screen, said screens being positioned to receive light from said system substantially simultaneously, and means for varying the distance between said system and said screens, the effective surfaces of said viewing screen and of said photosensitive screen being spaced such a distance from each other that when visible light is focused on the effective surface of said viewing screen by adjustment of said means light of said predetermined wave length is focused on the effective surface of said photosensitive screen.

2. In a television camera, an optical system, a photosensitive, electron emissive screen, a viewing screen surrounding said photosensitive screen at its side, said screens being positioned to receive light from said system substantially simultaneously, and means for varying the distance between said system and said screens, the effective surface of said viewing screen being spaced such a smaller distance from said system than the effective surface of said photosensitive screen that when visible light is focused on the effective surface of said viewing screen by adjustment of said means infra-red light is focused on the effective surface of said photosensitive screen.

3. In a television camera, a lens system, a photosensitive, electron emissive screen, a viewing screen supporting said photosensitive screen and extending laterally beyond said photosensitive screen, said screens being positioned to receive light from said system substantially simultaneously, and means for positioning said system with respect to said screens, the effective surface of said viewing screen being spaced such a smaller distance from said system than the effective surface of said photosensitive screen, that when visible light is focused on the effective surface of said viewing screen by adjustment of said means infra-red light is simultaneously focused on the effective surface of said photosensitive screen.

4. In a television camera, a lens system, a photosensitive, electron emissive screen, a transparent member supporting said photosensitive screen, said member having a viewing surface surrounding said photosensitive screen, said screen and said viewing surface being arranged to receive light from said system substantially simultaneously, and means for positioning said system with respect to said screen and said viewing surface, said viewing surface being spaced such a distance from the effective surface of said photosensitive screen that when visible light is focused on said viewing surface by adjustment of said means invisible light is simultaneously focused on the effective surface of said photosensitive screen.

5. In a television camera, a lens system, a photosensitive, electron emissive screen, a transparent member supporting said photosensitive screen, said member having a viewing surface extending laterally beyond said photosensitive screen, said screen and said viewing surface being arranged to receive light from said system substantially simultaneously, and means for positioning said system with respect to said screen and said viewing surface, said viewing surface being spaced such a smaller distance from said system than the effective surface of said photosensitive screen that when visible light is focused on said viewing surface by adjustment of said means infra-red light is simultaneously focused on the effective surface of said photosensitive screen.

WAYNE JOSEPH LUCKOCK.

REFERENCES CITED

The following references are of record in the file of this patent:

UNITED STATES PATENTS

| Number | Name | Date |
|---|---|---|
| 1,640,694 | Demming | Aug. 30, 1927 |
| 1,813,690 | Weisker | July 7, 1931 |
| 2,048,655 | Hineline | July 21, 1936 |
| 2,061,378 | Henze et al. | Nov. 17, 1936 |
| 2,149,455 | McGee et al. | Mar. 7, 1939 |
| 2,162,908 | Bedford | June 20, 1939 |
| 2,165,402 | Mihalyi | July 11, 1939 |
| 2,244,687 | Goldsmith | June 10, 1940 |
| 2,284,831 | McCanlies | June 2, 1942 |

OTHER REFERENCES

Proc. IRE, vol. 31, #3, March 1943, pages 100 to 106.

Journal Optical Society of America, vol. 7, 1923, pages 1167 to 1174.

Henney and Dudley "Handbook of Photography" published by Whittlesey House, New York, 1939, pages 606 and 607 cited.

Ser. No. 428,973, De France (A. P. C.), published June 15, 1943.